US010866831B2

(12) United States Patent
Seif et al.

(10) Patent No.: US 10,866,831 B2
(45) Date of Patent: Dec. 15, 2020

(54) DISTRIBUTED EXECUTION OF DATA PROCESSING PIPELINES

(71) Applicant: SAP SE, Walldorf (DE)

(72) Inventors: Simon Seif, Heidelberg (DE); Boris Gruschko, Heidelberg (DE); Joachim Fitzer, Schriesheim (DE)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 16/009,996

(22) Filed: Jun. 15, 2018

(65) Prior Publication Data

US 2019/0384635 A1 Dec. 19, 2019

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5083* (2013.01)

(58) Field of Classification Search
CPC .............................. G06F 9/4881; G06F 9/5083
See application file for complete search history.

(56) References Cited

U.S. PATENT DOCUMENTS

| 5,761,652 | A | 6/1998 | Wu |
| 5,790,119 | A | 8/1998 | Sklut |
| 5,918,225 | A | 6/1999 | White |
| 6,225,998 | B1 | 5/2001 | Okita |
| 6,374,236 | B1 | 4/2002 | Chen |
| 6,380,951 | B1 | 4/2002 | Petchenkine |
| 7,047,232 | B1* | 5/2006 | Serrano ................... G06F 8/456 |
| 7,337,174 | B1 | 2/2008 | Craig |
| 7,711,527 | B2 | 5/2010 | Sabadell |
| 7,797,342 | B2 | 9/2010 | Banks |

(Continued)

FOREIGN PATENT DOCUMENTS

| CN | 105334841 A | 2/1916 |
| EP | 2930629 A1 | 10/2015 |

OTHER PUBLICATIONS

AVS Applications Guide, 1992, 83 pages.

(Continued)

*Primary Examiner* — Camquy Truong
(74) *Attorney, Agent, or Firm* — Mintz Levin Cohn Ferris Glovsky and Popeo, P.C.

(57) ABSTRACT

A method for executing a data processing pipeline may be provided. The method may include identifying a file providing a runtime environment required for executing a series of data processing operations comprising the data processing pipeline. The file may be identified based on one or more tags associated with the data processing pipeline. The one or more tags may specify at least one runtime requirement for the series of data processing operations. The file may be executed to generate an executable package that includes a plurality of components required for executing the series of data processing operations. The series of data processing operations included in the data processing pipeline may be executed by at least executing the executable package to provide the runtime environment required for executing the series of data processing operations. Related systems and articles of manufacture, including computer program products, are also provided.

14 Claims, 6 Drawing Sheets

(56) References Cited

U.S. PATENT DOCUMENTS

| | | |
|---|---|---|
| 7,805,456 B2 | 9/2010 | Meijer |
| 7,844,910 B2 | 11/2010 | Shiraishi |
| 8,046,382 B2 | 10/2011 | Valentin |
| 8,056,012 B2 | 11/2011 | Chen |
| 8,117,061 B2 | 2/2012 | May |
| 8,151,208 B2 | 4/2012 | Sogge |
| 8,280,903 B2 | 10/2012 | Broder |
| 8,291,408 B1 | 10/2012 | Czymontek |
| 8,301,626 B2 * | 10/2012 | Blount ............... G06N 5/042 707/736 |
| 8,341,591 B1 | 12/2012 | Knauth |
| 8,401,819 B2 | 3/2013 | Kavaklioglu |
| 8,682,701 B1 | 3/2014 | Knauth |
| 8,977,600 B2 | 3/2015 | Crupi |
| 9,165,021 B2 | 10/2015 | Bhattacharjee |
| 9,311,615 B2 | 4/2016 | Davenport |
| 9,317,343 B1 | 4/2016 | Willhoit |
| 9,335,976 B1 | 5/2016 | Verwaest |
| 9,342,273 B1 | 5/2016 | Kumar |
| 9,344,492 B1 * | 5/2016 | Dantkale ............ G06F 12/0223 |
| 9,495,207 B1 | 11/2016 | Pjesivac-Grbovic |
| 9,823,950 B1 | 11/2017 | Carrier |
| 10,152,511 B2 | 12/2018 | Rajan et al. |
| 10,200,428 B1 | 2/2019 | Rosenzweig |
| 10,372,429 B2 | 8/2019 | Wang |
| 2001/0034881 A1 | 10/2001 | Washington |
| 2001/0037322 A1 | 11/2001 | Lindsay |
| 2002/0035559 A1 | 3/2002 | Crowe |
| 2004/0078364 A1 | 4/2004 | Ripley |
| 2004/0181422 A1 | 9/2004 | Brand |
| 2004/0230553 A1 | 11/2004 | Makowski |
| 2004/0230559 A1 | 11/2004 | Newman |
| 2005/0080755 A1 | 4/2005 | Aoyama |
| 2005/0138000 A1 | 6/2005 | Roux |
| 2006/0095894 A1 | 5/2006 | Wilde |
| 2007/0061777 A1 | 3/2007 | Vashi et al. |
| 2007/0168947 A1 | 7/2007 | Halbedel |
| 2007/0239797 A1 | 10/2007 | Cattell et al. |
| 2007/0250470 A1 | 10/2007 | Duffy |
| 2008/0046562 A1 * | 2/2008 | Butler ............... G06F 16/958 709/224 |
| 2008/0098053 A1 | 4/2008 | Miao et al. |
| 2008/0167842 A1 | 7/2008 | Cochran |
| 2008/0281786 A1 | 11/2008 | Duffy |
| 2008/0294374 A1 | 11/2008 | Guralnik |
| 2009/0228434 A1 | 9/2009 | Krishnamurthy |
| 2010/0114973 A1 | 5/2010 | Goyal |
| 2010/0131550 A1 | 5/2010 | Nakadai |
| 2010/0262633 A1 | 10/2010 | Bhattacharjee |
| 2011/0066668 A1 | 3/2011 | Guarraci |
| 2011/0119680 A1 | 5/2011 | Li |
| 2011/0276789 A1 | 11/2011 | Chambers |
| 2011/0276962 A1 | 11/2011 | Chambers |
| 2012/0079449 A1 | 3/2012 | Sanderson |
| 2012/0084315 A1 | 4/2012 | Schneider |
| 2012/0185499 A1 * | 7/2012 | Alpern ............... G06F 9/45558 707/769 |
| 2013/0073573 A1 | 3/2013 | Huang |
| 2013/0332873 A1 | 12/2013 | Shapiro |
| 2014/0032527 A1 | 1/2014 | Chambers |
| 2014/0081950 A1 | 3/2014 | Rajan |
| 2014/0089294 A1 | 3/2014 | Shankar |
| 2014/0101150 A1 | 4/2014 | Wang |
| 2014/0108861 A1 | 4/2014 | Abadi |
| 2014/0172914 A1 | 6/2014 | Elnikety |
| 2014/0351233 A1 | 11/2014 | Crupi |
| 2015/0178114 A1 | 6/2015 | Chambers |
| 2015/0261820 A1 | 9/2015 | Cheng |
| 2015/0277900 A1 | 10/2015 | O'Keeffe |
| 2015/0347096 A1 | 12/2015 | Hanna |
| 2015/0372877 A1 | 12/2015 | Tompkins |
| 2016/0055348 A1 | 2/2016 | Lewak |
| 2016/0092808 A1 | 3/2016 | Cheng |
| 2016/0098448 A1 | 4/2016 | McShane |
| 2016/0103659 A1 | 4/2016 | Tijanic |
| 2016/0133066 A1 | 5/2016 | Lavie |
| 2016/0299998 A1 * | 10/2016 | Isshiki ............... G06F 17/505 |
| 2016/0321606 A1 | 11/2016 | Kapil |
| 2017/0017797 A1 | 1/2017 | Chambers |
| 2017/0083822 A1 | 3/2017 | Adendorff |
| 2017/0092021 A1 | 3/2017 | Nielsen |
| 2017/0102978 A1 | 4/2017 | Pallath |
| 2017/0169217 A1 | 6/2017 | Rahaman |
| 2017/0242715 A1 | 8/2017 | Chambers |
| 2017/0262516 A1 | 9/2017 | Horowitz |
| 2017/0308547 A1 | 10/2017 | Gupta |
| 2018/0025160 A1 | 1/2018 | Hwang |
| 2018/0046926 A1 | 2/2018 | Achin |
| 2018/0150514 A1 | 5/2018 | Willems |
| 2018/0150515 A1 | 5/2018 | Merker |
| 2018/0329967 A1 | 11/2018 | Lee |
| 2019/0073373 A1 | 3/2019 | Surale |
| 2019/0108048 A1 | 4/2019 | Chen |

OTHER PUBLICATIONS

AVS Users Guide, Release 4, 1992, 368 pages.

Gorton, et al., Components in the Pipeline, IEEE Software, 2011, pp. 33-40.

Klien, A BASis (or ABASs) for Reasoning About Software Architectures, 2000, 10 pages.

Neumann, Efficiently compiling efficient query plans for modern hardware, Proceedings of the VLDB endowment, 2011, pp. 539-550.

Upson, et al., The application visualization system: a computational environment for scientific visualization, IEEE Computer Graphics & Applications, Jul. 1989, pp. 30-42.

Wikipedia entry, Visual programming language, Apr. 2019, 9 pages. Retrieved from https://en.wikipedia.org/wikiNisual_programming_language.

* cited by examiner

DISTRIBUTED EXECUTION OF DATA PROCESSING PIPELINES

TECHNICAL FIELD

The subject matter described herein relates generally to data processing and more specifically to executing a data processing pipeline in a distributed computing system.

BACKGROUND

Data processing may refer to the collection and/or manipulation of data including, for example, validation, sorting, summarization, aggregation, analysis, reporting, classification, and/or the like. But traditional data processing applications may be inadequate for handling exceptionally voluminous and/or complex data sets known as "big data." Instead, big data may require big data processing applications having advanced capabilities specifically tailored for the ingestion, cleansing, storage, analysis, sharing, transformation, and/or visualization of exceptionally voluminous and/or complex data sets.

SUMMARY

Systems, methods, and articles of manufacture, including computer program products, are provided for customizing an operator node in a graph representative of a data processing pipeline. In one aspect, there is provided a system including at least one data processor and at least one memory. The at least one memory may store instructions that cause operations when executed by the at least one data processor. The operations may include: dividing a graph representative of a data processing pipeline, the data processing pipeline including a series of data processing operations, the graph being divided into a first subgraph including some but not all of the series of data processing operations included in the data processing pipeline; identifying a first file providing a first runtime environment required for executing a first data processing operation included in the first subgraph; and triggering an execution of the data processing pipeline by at least sending, to a first computing node in a cluster of computing nodes, the first file, the first computing node being scheduled to execute the first data processing operation included in the first subgraph.

In some variations, one or more features disclosed herein including the following features can optionally be included in any feasible combination. The graph can be further divided into a second subgraph that includes some but not all of the series of data processing operations included in the data processing pipeline. A second computing node in the cluster of computing nodes can be scheduled to execute a second data processing operation included in the second subgraph.

In some variations, the first file can further provide a second runtime environment required for executing the second data processing operation included in the second subgraph. The triggering of the execution of the data processing pipeline can further include sending, to the second computing node, the first file.

In some variations, a second file can be identified for providing a second runtime environment required for executing the second data processing operation included in the second subgraph. The execution of the data processing pipeline can be triggered by at least sending, to the second computing node in the cluster of computing nodes, the second file In some variations, the first computing node can be scheduled to execute the first data processing operation and the second computing node can be scheduled to execute the second data processing operation. The scheduling can be based at least on a load balance and/or available resources across the cluster of computing nodes.

In some variations, the first file can include a script. The script can include a sequence of instructions. Executing the sequence of instructions can generate an executable package that includes a plurality of components required for executing the first data processing operation.

In some variations, the plurality of components required for executing the first data processing operation can include programming code, runtime, libraries, environment variables, and/or configuration files.

In some variations, the graph can include a plurality of nodes interconnected by one or more edges. Each of the plurality of nodes can correspond to a data processing operation from the series of data processing operations. The one or more edges can indicate a flow of data between different data processing operations.

In some variations, the first file can be identified based at least on a first tag associated with the first file matching a second tag associated with the first data processing operation. The first tag can specify at least one runtime requirement supported by the first file. The second tag can specify at least one runtime requirement of the first data processing operation.

In some variations, executing the first data processing operation can include receiving and/or sending data from database.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
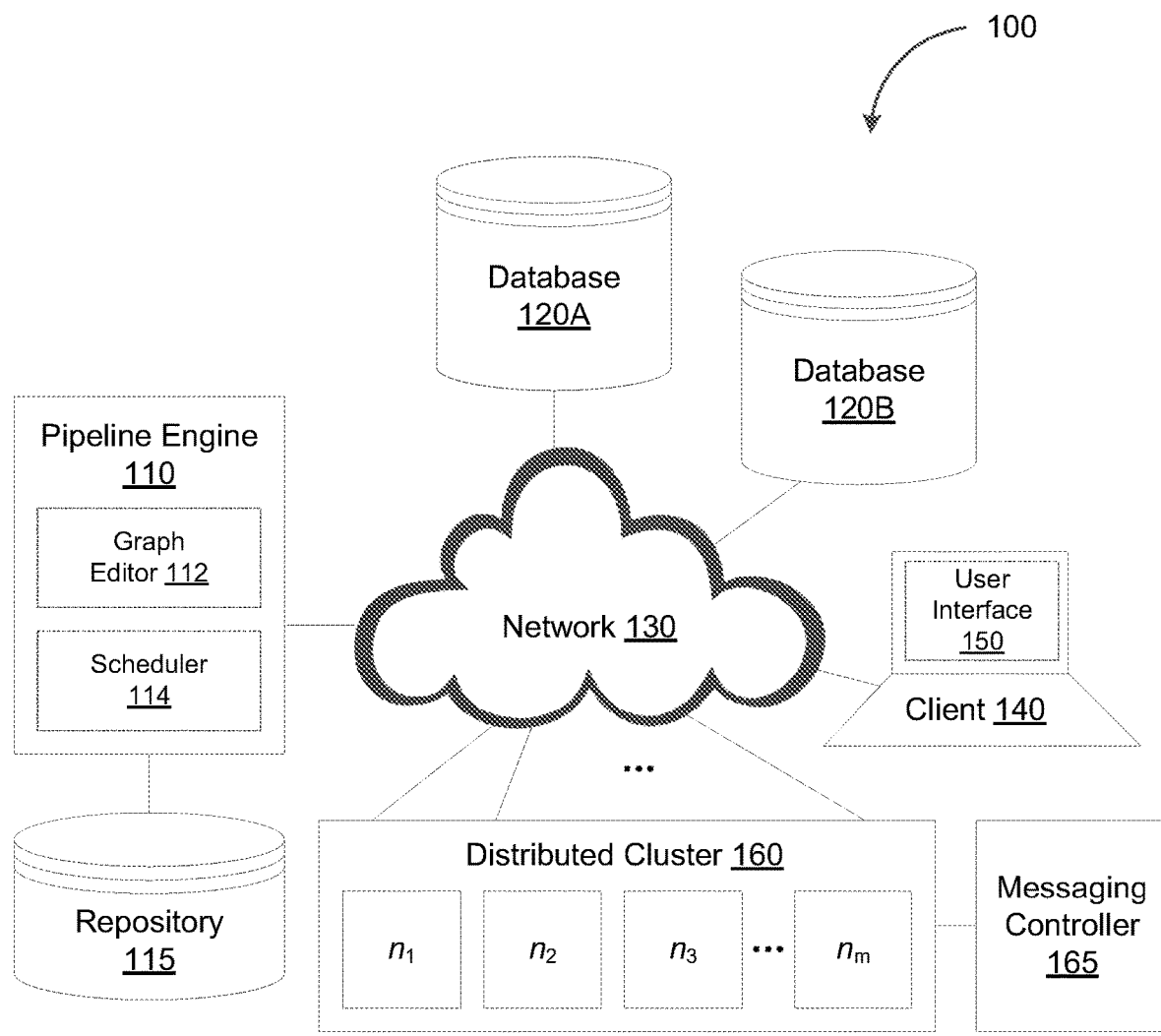
FIG. 1 depicts a system diagram illustrating a data processing pipeline generator system, in accordance with some example embodiments.

A data processing pipeline may include a series of operations for collecting and/or manipulating data including, for example, exceptionally voluminous and/or complex data sets known as "big data." The data processing pipeline may be represented graphically, for example, as a plurality of nodes interconnected by one or more directed edges. Each node may correspond to a data processing operation performed on the data traversing through the node. Meanwhile, the one or more directed edges may indicate a flow of data between the plurality of nodes.

In some example embodiments, a data processing pipeline engine may be configured to support the construction of graphs that are representative of data processing pipelines. For example, the data processing pipeline engine may provide a plurality of default operator nodes, each of which having one or more predefined configuration parameters. At least some of the plurality of operator nodes may be customized, for example, by modifying predefined configuration parameters and/or adding additional configuration parameters. A graph representative of a data processing pipeline may be constructed by at least interconnecting, with one or more directed edges, a plurality of default operator nodes and/or customized operator nodes. The graph may form the basis for generating the corresponding data processing pipeline. Executing the data processing pipeline may include applying, to data stored in a database, a series of data processing operations corresponding to the operator nodes included in the graph representative of the data processing pipeline.

In some example embodiments, a data processing pipeline may be executed by multiple computing nodes in a distributed computing system. For example, the graph corresponding to the data processing pipeline may include multiple subgraphs, each of which including some but not all of the operator nodes included in the graph. The data processing pipeline engine may schedule the data processing operations corresponding to the operator nodes included in the subgraphs for execution by different computing nodes in the distributed computing system. As such, at least some of the data processing operations included in the data processing pipeline may be executed asynchronously.

The execution of a data processing pipeline corresponding to a graph may be associated with one or more runtime environments. A runtime environment may provide, for example, the libraries, variables, configuration files, and/or services required for executing at least one of the data processing operations included in the data processing pipeline. But the execution of different data processing operations corresponding to different operator nodes in the graph may require different runtime environments. Moreover, the execution of a data processing operation corresponding to a customized operator node in the graph may require a customized runtime environment. As such, in some example embodiments, the data processing pipeline engine may provide one or more files known as dockerfiles for containerizing different runtime environments. When a computing node in a distributed computing system is scheduled to execute one or more data processing operations from a data processing pipeline, the data processing pipeline engine may send, to that computing node, the dockerfiles providing the runtime environment required for executing the data processing operations. The computing node may deploy the required runtime environments by at least executing the dockerfiles.

FIG. 1 depicts a system diagram illustrating a data processing pipeline generator system 100, in accordance with some example embodiments. Referring to FIG. 1, the data processing pipeline generator system 100 may include a pipeline engine 110. As shown in FIG. 1, the pipeline engine 110 may be communicatively coupled, via a network 130, with a first database 120A, a second database 120B, a client 140, and/or a distributed cluster 160. The network 130 may be any wired and/or wireless network including, for example, a public land mobile network (PLMN), a wide area network (WAN), a local area network (LAN), a virtual local area network (VLAN), the Internet, and/or the like.

In some example embodiments, the client 140 may interact with the pipeline engine 110 to generate one or more data processing pipelines. For example, as shown in FIG. 1, the pipeline engine 110 may be associated with a user interface 150 configured to receive, at the client 140, one or more inputs for editing a graph representative of a data processing pipeline. Alternatively and/or additionally, the user interface 150 may also be configured to display, at the client 140, the graph representative of the data processing pipeline during, for example, the editing process.

Figure 2:
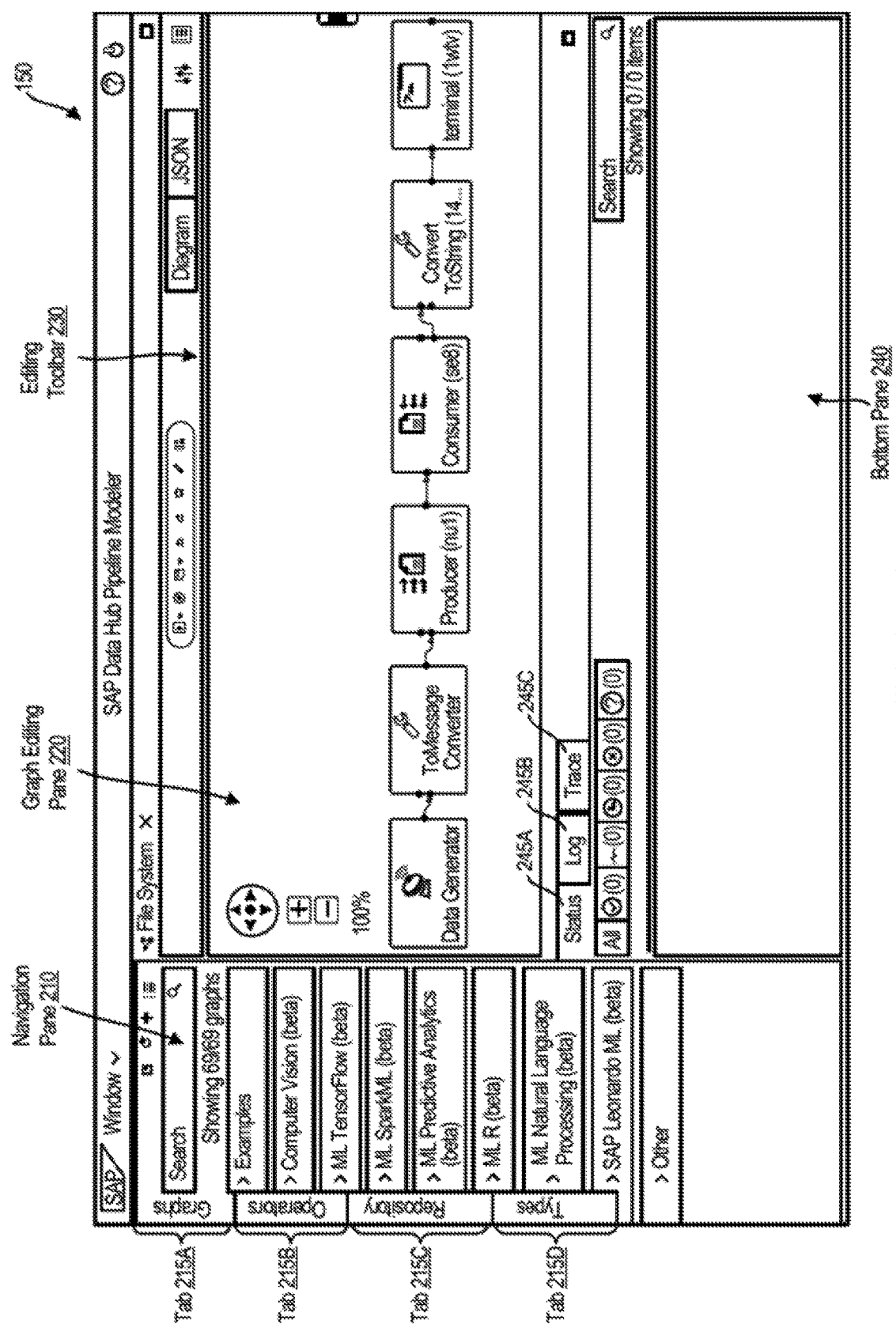
FIG. 2 depicts a user interface, in accordance with some example embodiments.

To further illustrate, FIG. 2 depicts the user interface 150. As shown in FIG. 2, the user interface 150 may include a navigation pane 210, a graph editing pane 220, an editing toolbar 230, and a bottom pane 240. In some example embodiments, the client 140 may access, via the navigation pane 210, one or more operator nodes, graphs, repositories, and/or types. For example, the navigation pane 210 may include a first tab 215A, a second tab 215B, a third tab 215C, and a fourth tab 215D. The client 140 may access, under the first tab 215A, a plurality of graphs representative of data processing pipelines. It should be appreciated that these graphs may include template graphs provided by the pipeline engine 110 and/or custom graphs created by the client 140. Meanwhile, the client 140 may access, under the second tab 215B, a plurality of default operator nodes provided by the pipeline engine 110 and/or customized operator nodes generated by the client 140.

Under the third tab 215C, the client 140 may access one or more repositories storing the dockerfiles that are available to the client 140 from the pipeline engine 110. As used herein, a dockerfile may be any file configured to provide the runtime environment required for executing a data processing pipeline including, for example, the data processing operations corresponding to the default operator nodes and/or customized operator nodes included in the data processing pipeline. For example, a dockerfile may include a script. The script may include a sequence of instructions, which may be executed to generate a docker image. Meanwhile, the docker image may be a stand-alone, executable package that includes all of the components necessary for executing one or more of the data processing operations included in the data processing pipeline including, for example, programming code, runtime, libraries, environment variables, configuration files, and/or the like. Accordingly, executing one or more data processing operations included in the data processing pipeline may include generating a docker image by at least executing a corresponding dockerfile. Furthermore, executing the one or more data processing operations may include executing the docker image in order to provide the necessary runtime environment.

Alternatively and/or additionally, the client 140 may access, under the fourth tab 215D, one or more types. As used herein, a type may refer to a data type including, for example, a string, an object, an array, a number, a Boolean, an integer, and/or the like. Each type may be associated with a definition (e.g., a JavaScript Object Notation (JSON) file) that includes the properties associated with the type. To further illustrate, Table 1 below depicts examples of data types and the corresponding properties. It should be appreciated that the input and/or output of an operator node may be associated with a type, which may determine the type of data that is ingested into and/or output by the operation corresponding to the operator node.

the second tab 215B of the navigation pane 210. In some example embodiments, commands for editing the graph displayed in the graph editing pane 220 may be selected via the editing toolbar 230. For example, the client 140 may customize an operator node added to and displayed in the graph editing pane 220 by selecting, from the editing toolbar 230, a command to customize the configurations of the operator node.

Alternatively and/or additionally, the client 140 may interconnect the operator nodes added to and displayed in the graph editing pane 220 by adding one or more directed edges. For example, the client 140 may interconnect a first operator node and a second operator node displayed in the graph editing pane 220 by selecting an output port on the first operator node and dragging a cursor from the selected output port to an input port on the second operator node.

In some example embodiments, the bottom pane 240 may include a status tab 245A, a log tab 245B, and a trace tab 245C. The client 140 may access, via the status tab 245A, the log tab 245B, and/or the trace tab 245C, a corresponding pane that displays a status of executing a data processing pipeline, which may correspond, for example, to a graph constructed and/or displayed in the graph editing pane 220.

Referring again to FIG. 1, the pipeline engine 110 may include a graph editor 112 and a scheduler 114. In some example embodiments, the graph editor 112 may support the construction of graphs that are representative of one or more data processing pipelines. Meanwhile, the scheduler 114 may execute the data processing pipelines corresponding to the graphs constructed via the graph editor 112 by at least scheduling the data processing operations included in the data processing pipelines for execution by one or more computing nodes in the distributed cluster 160. For example,

TABLE 1

| VALUE | DESCRIPTION |
|---|---|
| String | For properties of data type string, you can define helpers. These helpers enable users to easily identify and define the property values. In the Validation dropdown list, select a value. The tool provides format, predefined values, and services as helpers.<br>Format: You can choose from any of the supported formats such as date and time, URL, Password, or e-mail.<br>Predefined Values: You can preconfigure the property with list of values for users to choose. The property will be displayed to users as a dropdown list of values. In the Value field, provide the list of values.<br>Service: You can specify a URL to obtain the property values from the REST API. The tool displays the response from the service call as auto suggestions for the users. In the Url text field, specify the service URL.<br>⚠ Restriction<br>The response from the REST API must be an array of strings only. Also, the URL should be of same origin. Cross origin requests are not supported. |
| Object | For properties of data type object, you can specify the schema of the object by drilling down into the object definition. In the Schema Properties section, double-click the property to drill-down further and to modify the object definition. |
| Custom | Custom data types enable you to set the data type of a property to another user defined type. In the Type dropdown list, select a value. The tool populates the dropdown list with the global schema types. |
| Array | For properties of data type array, you can specify the data types of items in the array. In the Item Type dropdown list, select a value. The tool supports string. Number, and object as data types for array items. |
| Number | For properties of data type number, users can provide numbered values to the property. |
| Boolean | For properties of data type Boolean, users can provide Boolean values to the property. |
| Integer | For properties data type integer, users can provide integer values to the property. |

Referring again to FIG. 2, the client 140 may use the graph editing pane 220 to create a graph representative of a data processing pipeline. For example, as shown in FIG. 2, the client 140 may construct a graph by at least adding and/or removing operator nodes from the graph editing pane 220. The client 140 may select, for instance, a default operator node and/or a customized operator node from under a graph representative of a data processing pipeline may include multiple subgraphs, each of which including operator nodes that correspond to some but not all of the data processing operations included in the data processing pipeline. As such, in some example embodiments, the scheduler 114 may execute the data processing pipeline by at least scheduling the data processing operations corresponding to the different subgraphs for execution by different computing nodes from the distributed cluster 160.

To further illustrate, FIG. 1 shows the distributed cluster 160 as including an m quantity of computing nodes $n_1$, $n_2$, $n_3$, ..., $n_m$. In order to execute the data processing pipeline, the scheduler 114 may schedule the data processing operations corresponding different subgraphs for execution by one or more of the m quantity of computing nodes. For example, a first computing node $n_1$ may be scheduled to execute the data processing operations corresponding to one subgraph while a second computing node $n_2$ may be scheduled to execute the data processing operations corresponding to another subgraph. It should be appreciated that data processing operations that are scheduled for execution by different computing nodes may be executed asynchronously. For instance, the first computing node $n_1$ and the second computing node $n_2$ may simultaneously execute at least some of the data processing operations scheduled for execution by each computing node. Furthermore, as shown in FIG. 1, the distributed cluster 160 may be coupled with a messaging controller 165. In some example embodiments, the messaging controller 165 may be configured to coordinate the exchange of data between different nodes within the distributed cluster 160. For instance, the messaging controller 165 may coordinate the exchange of data between the first computing node $n_1$ and the second computing node $n_2$ by at least relaying data between first computing node $n_1$ and the second computing node $n_2$.

In some example embodiments, the scheduler 114 may send, to a computing node that is scheduled to execute one or more data processing operations, one or more dockerfiles configured to provide the runtime environment required for executing the data processing operations. For instance, as shown in FIG. 1, the pipeline engine 110 may be coupled with a repository 115 for storing a plurality of dockerfiles available at the pipeline engine 110. Upon scheduling a computing node to execute one or more data processing operations, the scheduler 114 may identify the one or more dockerfiles that provide the runtime environment required for executing the data processing operations. It should be appreciated that the one or more data processing operations may be associated with tags specifying the runtime requirements for the one or more data processing operations. Furthermore, each dockerfile stored in the repository 115 may also be associated with tags indicating the runtime requirements supported by each dockerfile. As such, according to some example embodiments, the scheduler 114 may identify a dockerfile as providing the runtime environment required for executing one or more data processing operations based at least on the dockerfile and the one or more data processing operations being associated with matching tags.

In some example embodiments, the data processing pipeline may include a series of data processing operations for collecting and/or manipulating data stored in one or more databases including, for example, the first database 120A. Furthermore, the data output by the series of data processing operations may also be stored in one or more databases including, for example, the second database 120B. It should be appreciated that messaging controller 165 may further be configured to coordinate the exchange of data between the computing nodes in the distributed cluster 160 and the first database 120A and/or the second database 120B. For example, the messaging controller 165 may relay data between the computing nodes in the distributed cluster 160 and the first database 120A and/or the second database 120B. Furthermore, it should be appreciated that the first database 120A and/or the second database 120B may be any type of database including, for example, an in-memory database, a hierarchical database, an object database, an object-relational database, a non-Structured Query Language (NoSQL) database, and/or the like. For instance, the first database 120A and/or the second database 120B may be a relational database, a graph database, a column store, a key-value store, a document store, and/or the like.

In some example embodiments, the computing nodes in the distributed cluster 160 that are the recipients of data may be identified based on the partitioning of a graph corresponding to a data processing pipeline. For example, the messaging controller 165 can provide a messaging queue to which one or more source computing nodes can post data. Meanwhile, one or more destination computing nodes can consume the data by at least reading from the messaging queue.

As noted, the pipeline engine 110 may support the construction of graphs representative of one or more data processing pipelines. For instance, a graph that is representative of a data processing pipeline may include a plurality of operator nodes, each of which corresponding to a data processing operation. Accordingly, to support the construction of graphs, the graph editor 112 may provide a selection of operator nodes including, for example, default operator nodes and/or customized operator nodes. An operator node may include one or more input ports and/or output ports, through which the operator node may be interconnected with other operator nodes to form a graph representative of a data processing pipeline. Furthermore, an operator node may be associated with an operation, which may be performed on the data traversing through the operator node. For example, an operator node may be configured, by default and/or through customization, to serve as connectors to messaging systems, connectors to store and read data, connectors to databases, engines for manipulating arbitrary data, processor operators for executing any program, type converters, digital signal processors, image processors, machine learning models, and/or the like.

In some example embodiments, the client 140 may select, for example, via the user interface 150, one or more default operator nodes to add to a graph that is representative of a data processing pipeline. At least some of the selection of default operator nodes provided by the graph editor 112 may be customized by the client 140. For instance, the client 140 may customize a default operator node by modifying a predefined configuration parameter of the default operator node, for example, by changing a value associated with the predefined configuration parameter to a value specified by the client 140. Alternatively and/or additionally, the default operator node may be customized by adding additional configuration parameters to the default operator node. To further illustrate, Table 2 below depicts examples of configuration parameters and values associated with various operator nodes in a data processing pipeline for performing text analysis.

TABLE 2

| OPERATOR | CONFIGURATION PARAMETER | VALUE |
| --- | --- | --- |
| HDF S Consumer (Operator id: hdfsconsumer2) | path | Path to the folder on HDFS to be tokenized |
| | hadoopUser | Username to logon to the HDFS server |
| | hadoopNameNode | Host name and port number of the HDFS server |
| | pollPeriodInMs | Interval between two content change detection events, must be >= 1000 |
| | onlyReadOnChange | true |
| | Recursive | True |
| HDFS Producer (Operator id: old-hdfsproducer1) | hadoopUser | Username to logon to the HDFS server (must be the same as in hdfsconsumer2) |
| | hadoopNameNode | Host name and port number of the HDFS server (must be the same as in hdfsconsumer2) |
| HDFS Producer (Operator id: old-hdfsproducer2) | hadoopUser | Username to logon to the HDFS server (must be the same as in hdfsconsumer2) |
| | hadoopNameNode | Host name and port number of the HDFS server (must be the same as in hdfsconsumer2) |
| Webservices (Operator id: javascriptoperator1) | service | One of the following service types: EntityExtraction4 LanguageIdentificationdir LinguisticAnalysis# EnterpriseFactExtraction4 PublicSectorFactExtraction4 SentimentAnalysis# |
| OpenAPI Client (Operator id: openapickent1) | apiKeyValue | The API key |
| JavaScript Operator2 (Operator id: javascriptoperator21) | WriteLogFile | If true, a log file with possible messages from the API server is written in the HDFS server |

Figure 3A:
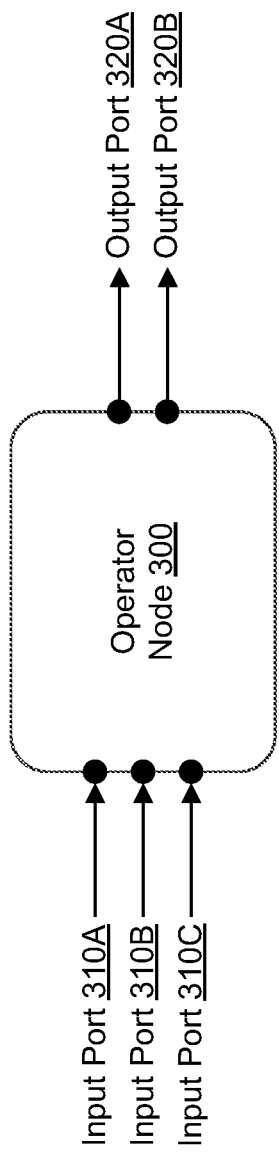
FIG. 3A depicts an example of an operator node, in accordance with some example embodiments.

To further illustrate, FIG. 3A depicts an operator node 300, in accordance with some example embodiments. Referring to FIGS. 1-2 and 3A, the operator node 300 may be a default operator node provided by the pipeline engine 110 and associated with one or more predefined configuration parameters. Alternatively and/or additionally, the operator node 300 may be a customized operator node created by the client 140. In some example embodiments, the operator node 300 may be accessed, for example, by the client 140, under the second tab 215B. For example, the client 140 may select the operator node 300 in order to add the operator node 300 to a graph representative of a data processing pipeline. The client 140 may further select the operator node 300 in order to customize the operator node 300 including by, for example, modifying one or more existing configuration parameters of the operator node 300 and/or adding additional configuration parameters to the operator node 300.

Referring again to FIG. 3A, the operator node 300 may include one or more input ports including, for example, a first input port 310A, a second input port 310B, and/or a third input port 310C. Alternatively and/or additionally, the operator node 300 may include one or more output ports including, for example, a first output port 320A and/or a second output port 320B. In some example embodiments, the operator node 300 may be interconnected, via the input ports and/or the output ports, with one or more other operator nodes to form the graph representative of the data processing pipeline. For example, the client 140 may connect the operator node 300 to another operator node by selecting the first output port 320A and/or the second output port 320B, and dragging a cursor from the first output port 320A and/or the second output port 320B to one or more input ports of the other operator node. The client 140 may also connect the operator node 300 to another operator node by selecting one or more output ports on the other operator node and dragging a cursor from these output ports to the first input port 310A, the second input port 310B, and/or the third input port 310C of the operator node 300. In doing so, the client 140 may connect the operator node 300 to one or more operator nodes with directed edges indicating the flow of data to and/or from the operator node 300.

In some example embodiments, an output port may be connected to an input port if the output port and the input port are associated with compatible types. The pipeline engine 110 may provide visual indications that enables a visual differentiation between compatible ports and incompatible ports. For example, compatible ports may be displayed, for example, in the user interface 150, using the same color and/or icons. As noted, a type may refer to a data type including, for example, a string, an object, an array, a number, a Boolean, an integer, and/or the like. Accordingly, the first input port 310A, the second input port 310B, and/or the third input port 310C of the operator node 300 may interconnected to the output ports of the other operator node if the ports are associated with compatible types. Similarly, the first output port 320A and/or the second output port 320B may be interconnected to the input ports of the other operator node if the ports are associated with compatible types.

Table 3 below depicts examples of compatible port types. For instance, an input port having the type "string.com" may be compatible with an output port having the type "string.com.sap." As such, an input port having the type "string.com" may be interconnected with an output port having the type "string.com.sap." In some example embodiments, the pipeline engine 110 may display the input port having the type "string.com" and the output port having the type "string.com.sap," for example, in the user interface 150, using the same color and/or icon in order to indicate the compatibility between these two ports. Furthermore, the interconnection between the input port and the output port may, for example, by a directed edge. The directed edge may originate from the output port and terminate at the input port, thereby indicating a flow of data from the output port into the input port.

TABLE 3

| INPUT PORT TYPES | OUTPUT PORT TYPES |
| --- | --- |
| any | any |
| any | any.* |
| any | string |
| any.* | string.* |
| any.* | string.com.sap |
| any.* | string.com.sap.* |
| Any.com.sap | any.com.sap |
| String.com.* | string.com.sap.* |

Table 4 below depicts examples of incompatible port types. For example, an input port having the type "float64." may be incompatible with an output port having the type "int64." As such, an input port having the type "float64." may be not interconnected with an output port having the type "int64." In some example embodiments, the pipeline engine 110 may display the input port having the type "float64." and the output port having the type "int64," for example, in the user interface 150, using different colors and/or icons in order to indicate the incompatibility between these two ports.

TABLE 4

| INPUT PORT TYPES | OUTPUT PORT TYPES |
| --- | --- |
| any | any.com |
| any | any.com* |
| float64.* | int64.* |
| stream | any |

Figure 3B:
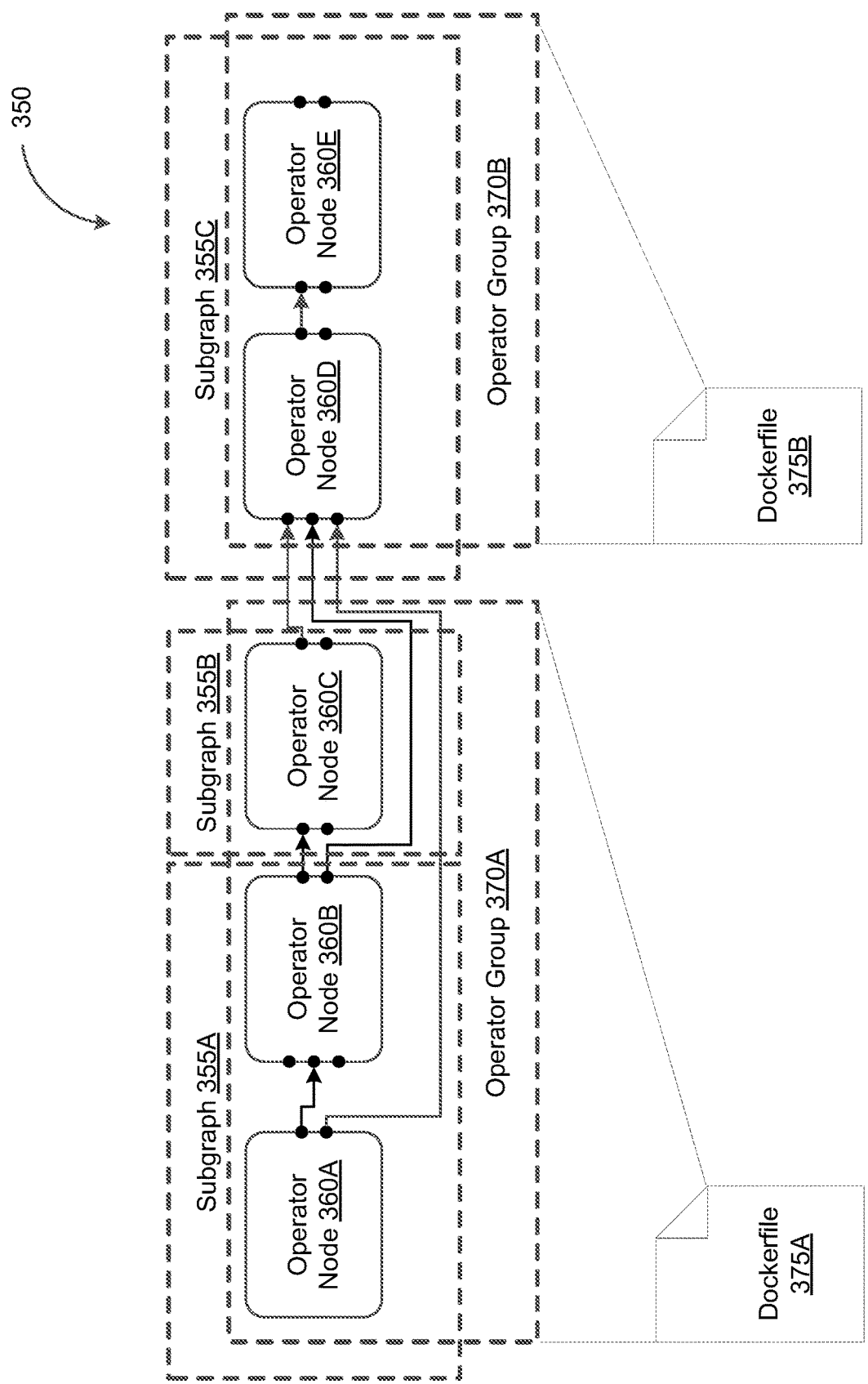
FIG. 3B depicts an example of a graph representative of a data processing pipeline, in accordance with some example embodiments.

FIG. 3B depicts a graph 350 representative of a data processing pipeline, in accordance with some example embodiments. Referring to FIG. 3B, the graph 350 may include a plurality of operator nodes including, for example, a first operator node 360A, a second operator node 360B, a third operator node 360C, a fourth operator node 360D, and/or a fifth operator node 360E. Each of the first operator node 360A, the second operator node 360B, the third operator node 360C, the fourth operator node 360D, and/or the fifth operator node 360E may correspond to a data processing operation performed on the data traversing through each individual operation node.

Furthermore, as FIG. 3B shows, the first operator node 360A, the second operator node 360B, the third operator node 360C, the fourth operator node 360D, and/or the fifth operator node 360E may be interconnected via one or more directed edges, each of which indicating a flow of data to and/or from the individual operator nodes. As noted, a first operator node may be interconnected to a second operator node by selecting an output port on the first operator node and dragging a cursor from the output port to an input port on the second operator node. For instance, the first operator node 360A may be interconnected to the fourth operator node 360D by selecting an output port on the first operator node 360A and dragging a cursor from the output port on the first operator node 360A to an input port on the fourth operator node 360D. According to some example embodiments, the first operator node 360A may be interconnected with the fourth operator node 360D if the output port on the first operator node 360A and the input port on the fourth operator node 360D are associated with compatible types.

As shown in FIG. 3B, the graph 350 may include a plurality of subgraphs including, for example, a first subgraph 355A, a second subgraph 355B, and/or a third subgraph 335C. Each of the first subgraph 335A, the second subgraph 335B, and the third subgraph 335C may include some but not all of the operator nodes included in the graph 350. It should be appreciated that the pipeline engine 110, for example, the scheduler 114, may determine to divide the graph 350 into the first subgraph 335A, the second subgraph 335B, and/or the third subgraph 335C as part of executing the corresponding data processing pipeline. For instance, in some example embodiments, the pipeline engine 110, for example, the scheduler 114, may divide the graph 350 based on a load balance and/or resource availability across different computing nodes in the distributed cluster 160. The division of the graph 350 and the allocation of computing resources within the distributed cluster 160 may be transparent to the client 140. This transparency may reflect a serverless programming paradigm implemented by the pipeline engine 110 in which the client 140 is not required to determine and/or coordinate the allocation of computing resources for executing a data processing pipeline.

Referring again to FIG. 3B, the first subgraph 355A may include the first operator node 360A and the second operator node 360B, the second subgraph 355B may include the third operator node 360C, and the third subgraph 355C may include the fourth operator node 360D and the fifth operator node 360E. According to some example embodiments, the pipeline engine 110, for example, the scheduler 114, may schedule the data processing operations corresponding to each of the first subgraph 335A, the second subgraph 335B, and the third subgraph 335C to be executed by a different computing node from the distributed cluster 160. For example, the first computing node $n_1$ may be scheduled to execute the data processing operations corresponding to the first subgraph 335A while the second computing node $n_2$ may be scheduled to execute the data processing operations corresponding to the second subgraph 335B. Alternatively and/or additionally, a third computing node $n_3$ may be scheduled to execute the data processing operations corresponding to the third subgraph 335C. The pipeline engine 110, for example, the scheduler 114, may send, to each of the first computing node $n_1$, the second computing node $n_2$, and the third computing node $n_3$, one or more dockerfiles providing the runtime environment required to execute the data processing operations.

In some example embodiments, the client 140 may assign each of the first operator node 360A, the second operator node 360B, the third operator node 360C, the fourth operator node 360D, and the fifth operator node 360E to an operator group. For example, as shown in FIG. 3B, the first operator node 360A, the second operator node 360B, and the third operator node 360C may be assigned to a first operator group 370A while the fourth operator node 360D and the fifth operator node 360E may be assigned to a second operator group 370B. The data processing operations included in each of the first operator group 370A and the second operator group 370B may be associated with the same runtime requirements. As such, the first operator group 370A may be associated with a first dockerfile 375A containerizing the runtime environment required for executing the data processing operations corresponding to the first operator node 360A, the second operator node 360B, and the third operator node 360C. Alternatively and/or additionally, the second operator group 370B may be associated with a second dockerfile 375B containerizing the runtime environment required for executing the data processing operations corresponding to the fourth operator node 360D and the fifth operator node 360E.

The pipeline engine 110, for example, the scheduler 114, may send, to each computing node scheduled to perform one or more data processing operations from the data processing pipeline corresponding to the graph 350, one or more dockerfiles providing the runtime environment required to execute the data processing operations. Accordingly, the pipeline engine 110, for example, the scheduler 114, may send, to the first computing node $n_1$ and the second computing node $n_2$, the first dockerfile 375A containerizing the runtime environment required to execute the data processing operations corresponding to the first subgraph 355A and the second subgraph 355B. Alternatively and/or additionally, the pipeline engine 110, for example, the scheduler 114, may send, to the third computing node $n_3$, the second dockerfile 375B containerizing the runtime environment required to execute the data processing operations corresponding to the third subgraph 355C.

According to some example embodiments, the first dockerfile 375A and the second dockerfile 375B may each include a script containing sequence of instructions, which may be executed to generate corresponding docker images. Meanwhile, a docker image may be a stand-alone, executable package that includes all of the components necessary for executing one or more data processing operations including, for example, programming code, runtime, libraries, environment variables, configuration files, and/or the like. For instance, executing the first dockerfile 375A, for example, at the first computing node $n_1$ and/or the second computing node $n_2$, may generate a docker image that includes all of the components necessary for executing the data processing operations corresponding to the first operator node 360A, the second operator node 360B, and the third operator node 360C. Alternatively and/or additionally, executing the second dockerfile 375B, for example, at the third computing node $n_3$, may generate a docker image that includes all of the components necessary for executing the data processing operations corresponding to the fourth operator node 360D and the fifth operator node 360E.

As noted, in some example embodiments, the messaging controller 160 may be configured to coordinate the exchange of data between the first computing node $n_1$, the second computing node $n_2$, and/or the third computing node $n_3$. Alternatively and/or additionally, the messaging controller 160 may also coordinate the exchange of data between the first computing node $n_1$, the second computing node $n_2$, and/or the third computing node $n_3$ and one or more data stores including, for example, the first database 120A and/or the second database 120B. For instance, the first computing node $n_1$ may be scheduled to perform one or more data processing operations on data stored in the first database 120A while the second computing node $n_2$ may be scheduled to perform one or more data processing operations a result of the data processing operations executed at the first computing node $n_1$. Furthermore, the result of the data processing operations executed at the third computing node $n_3$ may be stored to the second database 120B. Accordingly, the messaging controller 160 may be configured to relay data from the first database 120A to the first computing node $n_1$ and relay output data from the first computing node $n_1$ to the second computing node $n_2$. The messaging controller 160 may be further configured to relay output data from the third computing node $n_3$ to the second database 120B.

Figure 4:
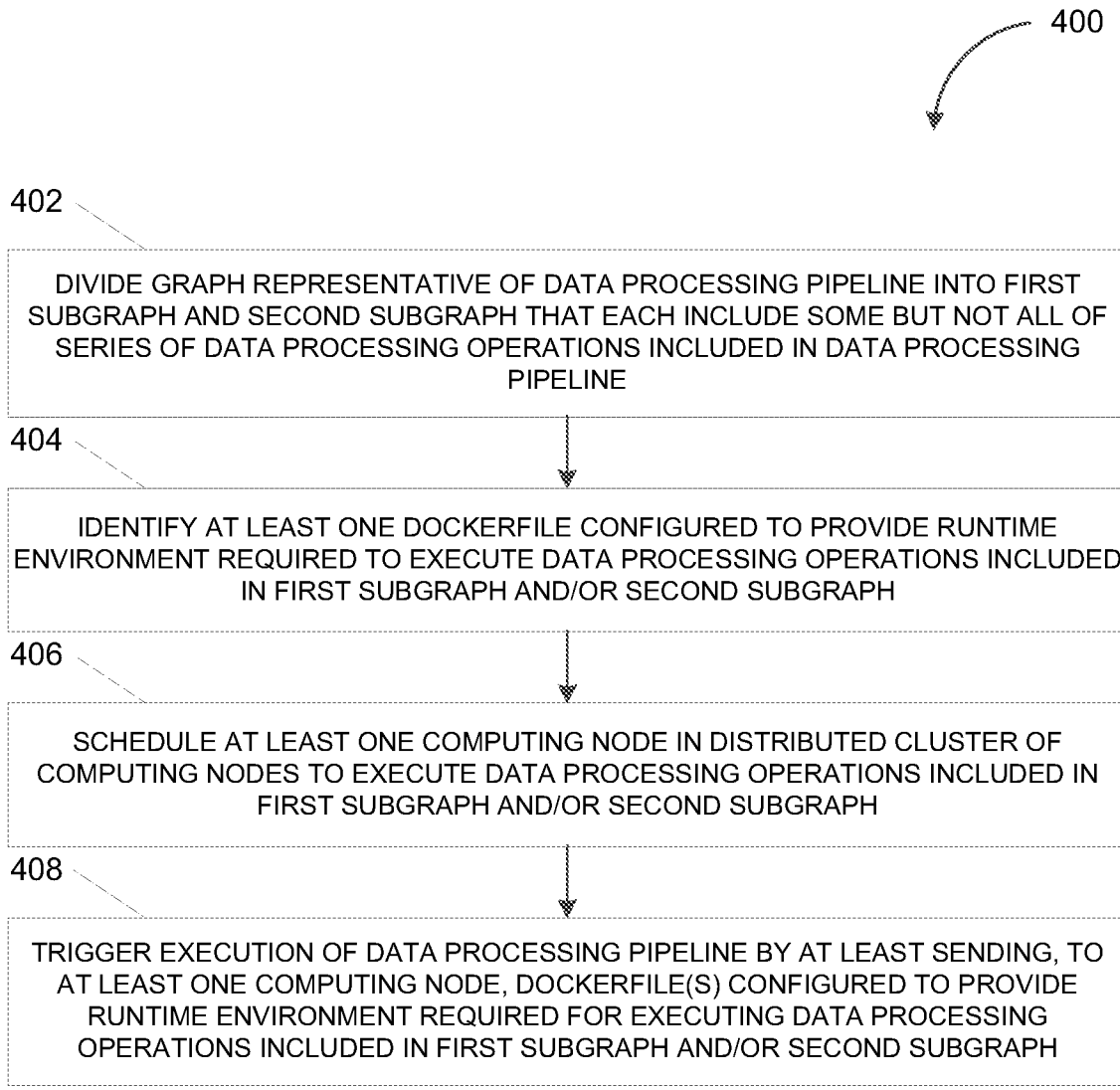
FIG. 4 depicts a flowchart illustrating a process for executing a data processing pipeline, in accordance with some example embodiments.

FIG. 4 depicts a flowchart illustrating a process 400 for customizing an operator node, in accordance with some example embodiments. Referring to FIGS. 1-2, 3A-B, and 4, the process 400 may be performed by the pipeline engine 110 in order to execute a data processing pipeline such as, for example, the data processing pipeline corresponding to the graph 350.

At 402, the pipeline engine 110 may divide a graph representative of a data processing pipeline into a first subgraph and a second subgraph that each includes some but not all of a series of data processing operations included in the data processing pipeline. For example, the pipeline engine 110, for example, the scheduler 114, may divide the graph 350 into the first subgraph 355A, the second subgraph 355B, and/or the third subgraph 355C. Each of the first subgraph 355A, the second subgraph 355B, and the third subgraph 355C may include some but not all of the operator nodes included in the graph 350. In some example embodiments, the pipeline engine 110, for example, the scheduler 114, may divide the graph 350 based on a load balance and/or a resource availability across different computing nodes in the distributed cluster 160.

At 404, the pipeline engine 110 may identify at least one dockerfile configured to provide a runtime environment required for executing the data processing operations included in the first subgraph and/or the second subgraph. For example, as shown in FIG. 3B, the first subgraph 355A and the second subgraph 355B may be part of a first operator group 370A that requires the runtime environment provided by the first dockerfile 375A. Meanwhile, the third subgraph 355C may be part of the second operator group 370B that requires the runtime environment provided by the second dockerfile 375B. In some example embodiments, the pipeline engine 110, for example, the scheduler 114, may identify the first dockerfile 375A based at least on the first dockerfile 375A and the data processing operations included in the first operator group 370A being associated with matching tags. Alternatively and/or additionally, the pipeline engine 110, for example, the scheduler 114, may identify the second dockerfile 375B based at least on the second dockerfile 375B and the data processing operations included in the second operator group 370B being associated with matching tags.

At 406, the pipeline engine 110 may schedule at least one computing node in a distributed cluster of computing nodes to execute the data processing operations included in the first subgraph and/or the second subgraph. For instance, the pipeline engine 110, for example, the scheduler 114, may schedule the first computing node $n_1$ to execute the data processing operations corresponding to the first subgraph 355A and the second computing node $n_2$ to execute the data processing operations corresponding to the second subgraph 355B. Furthermore, the third computing node $n_3$ may be scheduled to execute the data processing operations corresponding to the third subgraph 355C.

At 408, the pipeline engine 110 may trigger an execution of the data processing pipeline by at least sending, to the at least one computing node, one or more dockerfiles configured to provide a runtime environment required for executing the data processing operations included in the first subgraph and/or the second subgraph. As noted, the first dockerfile 375A may provide the runtime environment required for executing the data processing operations corresponding to the first subgraph 355A and the second subgraph 355B. Accordingly, in some example embodiments, the pipeline engine 110, for example, the scheduler 114, may execute the data processing operations corresponding to the first subgraph 355A and the second subgraph 355B by at least sending, to the first computing node $n_1$ and the second computing node $n_2$, the first dockerfile 375A. Alternatively and/or additionally, the second dockerfile 375B may provide the runtime requirement required for executing the data processing operations corresponding to the third subgraph 355C. As such, the pipeline engine 110, for example, the scheduler 114, may execute the data processing operations corresponding to the third subgraph 355C by at least sending, to the third computing node $n_3$, the second dockerfile 375B.

In some example embodiments, the data processing operations corresponding to the first subgraph 355A, the second subgraph 355B, and the third subgraph 355C may be executed by at least executing the first dockerfile 375A and/or the second dockerfile 375B. As noted, the first dockerfile 375A and the second dockerfile 375B may each include a script containing a sequence of instructions. Executing the sequence of instructions included in the first dockerfile 375A and/or the second dockerfile 375B may generate a corresponding docker image, which may be a stand-alone, executable package that includes all of the components necessary for executing one or more of the data processing operations included in the data processing pipeline. Accordingly, the first dockerfile 375A may be executed at the first computing node $n_1$ and/or the second computing node $n_2$ to generate a docker image that provides the necessary runtime environment for executing the data processing operations corresponding to the first operator node 360A, the second operator node 360B, and the third operator node 360C. Alternatively and/or additionally, the second dockerfile 375B may be executed at the third computing node $n_3$ to generate a docker image that provides the necessary runtime environment for executing the data processing operations corresponding to the fourth operator node 360D and the fifth operator node 360E.

Figure 5:
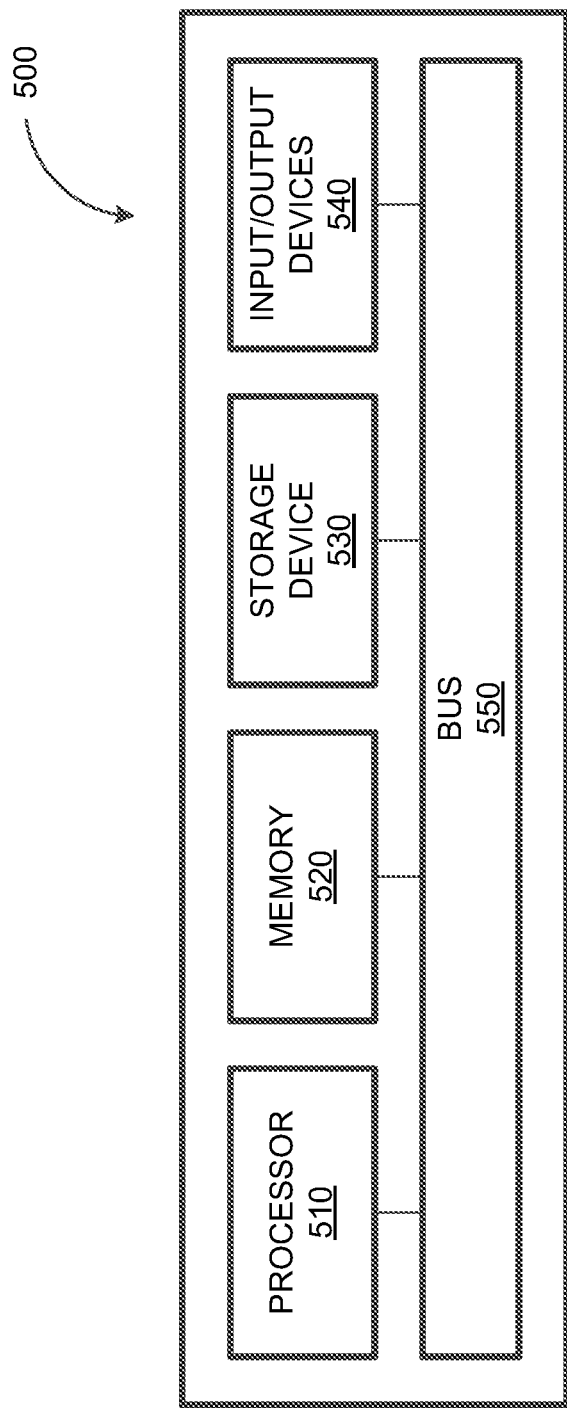
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the pipeline engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the pipeline engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      dividing a graph representative of a data processing pipeline, the data processing pipeline including a series of data processing operations, the graph being divided into a first subgraph and a second subgraph, each of the first subgraph and the second subgraph including some but not all of the series of data processing operations included in the data processing pipeline;
      identifying a first file providing a first runtime environment required for executing a first data processing operation included in the first subgraphs;
      identifying a second file providing a second runtime environment required for executing a second data processing operation included in the second subgraph, each of the first file and the second file comprising a script including a sequence of instructions, and executing the sequence of instructions generates an executable package that includes a plurality of components required for executing each of the first data processing operation and the second data processing operation; and
      triggering an execution of the data processing pipeline by at least sending the first file to a first computing node in a cluster of computing nodes and the second file to a second computing node in the cluster of computing nodes the first computing node being scheduled to execute the first data processing operation included in the first subgraph, and the second computing node being scheduled to execute the second data processing operation included in the second subgraph.

2. The system of claim 1, wherein the first computing node is further scheduled to execute a third data processing operation include in the first subgraph, wherein the second runtime environment is required for executing the third data processing operation, and wherein the execution of the data processing pipeline is further triggered by at least sending, to the first computing node, the second file.

3. The system of claim 1, further comprising:
   scheduling the first computing node to execute the first data processing operation and the second computing node to execute the second data processing operation, the scheduling being based on at least one of a load balance and available resources across the cluster of computing nodes.

4. The system of claim 1, wherein the plurality of components required for executing the first data processing operation includes at least one of a programming code, a runtime, a library, an environment variable, and a configuration file.

5. The system of claim 1, wherein the graph includes a plurality of nodes interconnected by one or more edges, wherein each of the plurality of nodes correspond to a data processing operation from the series of data processing operations, and wherein the one or more edges indicate a flow of data between different data processing operations.

6. The system of claim 1, wherein the first file is identified based at least on a first tag associated with the first file matching a second tag associated with the first data processing operation, wherein the first tag specifies at least one runtime requirement supported by the first file, and wherein the second tag specifies at least one runtime requirement of the first data processing operation.

7. The system of claim 1, wherein executing the first data processing operation includes at least one of receiving data from a database and sending data to the database.

8. A computer-implemented method, comprising:
   dividing a graph representative of a data processing pipeline, the data processing pipeline including a series of data processing operations, the graph being divided into a first subgraph and a second subgraph, each of the first subgraph and the second sub graph including some but not all of the series of data processing operations included in the data processing pipeline;

identifying a first file providing a first runtime environment required for executing a first data processing operation included in the first subgraphs;

identifying a second file providing a second runtime environment required for executing a second data processing operation included in the second subgraph, each of the first file and the second file comprising a script including a sequence of instructions, and executing the sequence of instructions generates an executable package that includes a plurality of components required for executing each of the first data processing operation and the second data processing operation; and triggering an execution of the data processing pipeline by at least sending the first file to a first computing node in a cluster of computing nodes and the second file to a second computing node in the cluster of computing nodes, the first computing node being scheduled to execute the first data processing operation included in the first subgraph, and the second computing node being scheduled to execute the second data processing operation included in the second subgraph.

9. The method of claim 8, wherein the first computing node is further scheduled to execute a third data processing operation include in the first subgraph, wherein the second runtime environment is required for executing the third data processing operation, and wherein the execution of the data processing pipeline is further triggered by at least sending, to the first computing node, the second file.

10. The method of claim 8, further comprising:
scheduling the first computing node to execute the first data processing operation and the second computing node to execute the second data processing operation, the scheduling being based on at least one of a load balance and available resources across the cluster of computing nodes.

11. The method of claim 8, wherein the plurality of components required for executing the first data processing operation includes at least one of a programming code, a runtime, a library, an environment variable, and a configuration file.

12. The method of claim 8, wherein the graph includes a plurality of nodes interconnected by one or more edges, wherein each of the plurality of nodes correspond to a data processing operation from the series of data processing operations, and wherein the one or more edges indicate a flow of data between different data processing operations.

13. The method of claim 8, wherein the first file is identified based at least on a first tag associated with the first file matching a second tag associated with the first data processing operation, wherein the first tag specifies at least one runtime requirement supported by the first file, and wherein the second tag specifies at least one runtime requirement of the first data processing operation.

14. A non-transitory computer-readable medium storing instructions, which when executed by at least one data processor, result in operations comprising:

dividing a graph representative of a data processing pipeline, the data processing pipeline including a series of data processing operations, the graph being divided into a first subgraph and a second subgraph, each of the first subgraph and the second sub graph including some but not all of the series of data processing operations included in the data processing pipeline;

identifying a first file providing a first runtime environment required for executing a first data processing operation included in the first subgraphs;

identifying a second file providing a second runtime environment required for executing a second data processing operation included in the second subgraph, each of the first file and the second file comprising a script including a sequence of instructions, and executing the sequence of instructions generates an executable package that includes a plurality of components required for executing each of the first data processing operation and the second data processing operation; and triggering an execution of the data processing pipeline by at least sending the first file to a first computing node in a cluster of computing nodes and the second file to a second computing node in the cluster of computing nodes, the first computing node being scheduled to execute the first data processing operation included in the first subgraph, and the second computing node being scheduled to execute the second data processing operation included in the second subgraph.

* * * * *